(12) United States Patent
Church et al.

(10) Patent No.: US 6,270,415 B1
(45) Date of Patent: Aug. 7, 2001

(54) METHOD FOR BI-DIRECTIONAL DATA COMMUNICATION IN A DIGITAL GAME PORT

(75) Inventors: Robert L. Church, Tujunga, CA (US); Doyle A. Nickless, Beaverton, OR (US); Stephen T. Kaminsky, Salem, OR (US); Louis A. Ashford, Aloha, OR (US)

(73) Assignee: Guillemot Corporation (FR)

( * ) Notice: Subject to any disclaimer, the term of this patent is extended or adjusted under 35 U.S.C. 154(b) by 0 days.

(21) Appl. No.: 09/100,587

(22) Filed: Jun. 19, 1998

Related U.S. Application Data

(63) Continuation-in-part of application No. 08/912,248, filed on Aug. 15, 1997.

(51) Int. Cl.[7] ................................................ A63F 9/24
(52) U.S. Cl. ............................. 463/40; 463/36; 463/37; 273/148 B
(58) Field of Search .................... 463/36, 37, 38, 463/39, 40, 41; 273/148 B, 148 R; 710/2

(56) References Cited

U.S. PATENT DOCUMENTS

| | | | |
|---|---|---|---|
| 5,276,443 | * | 1/1994 | Gates et al. ............... 340/825.06 |
| 5,610,631 | * | 3/1997 | Bouton et al. . | |
| 5,691,898 | * | 11/1997 | Rosenberg et al. ............ 364/190 |
| 5,733,194 | * | 3/1998 | Priem .................................. 463/36 |
| 5,754,828 | * | 5/1998 | Adan et al. .................... 395/500 |
| 5,805,094 | * | 9/1998 | Roach et al. ................. 341/144 |
| 6,038,616 | * | 3/2000 | Thornton et al. ................ 710/2 |
| 6,084,573 | * | 7/2000 | Tsai et al. ........................ 345/161 |

* cited by examiner

Primary Examiner—Lee Young
Assistant Examiner—Minh Trinh
(74) Attorney, Agent, or Firm—Marger Johnson & McCollom P.C.

(57) ABSTRACT

The invention uses the conventional PC game port as a port for a digital game input device, employing a Digital Game Port (DGP) protocol which uses the four discrete or button lines and a single analog line (one of four) on the conventional game board to form a dual serial port. Data from a DGP control device is packetized with each packet consisting of 13 bytes of data. The packets or blocks are then grouped into frames. A frame consists of two blocks of data. A total of two frames are transmitted to the driver for each driver request. The 13-byte data block is divided between six one byte analog values and four bytes of digital data, with three bytes that identify and define the device. This device definition and identification is unique. By sending the device identification and configuration to the driver, the driver can determine not only the presence of the device but also very specific aspects of the device. The hardware configuration of the cable enables the driver to uniquely identify the first unit connected to the host computer as the master unit. The driver identifies the other units, if any, as slave units. Up to 3 additional slave units may be chained from the master digital game port input device by such cables.

7 Claims, 9 Drawing Sheets

Microfiche Appendix Included
(3 Microfiche, 55 Pages)

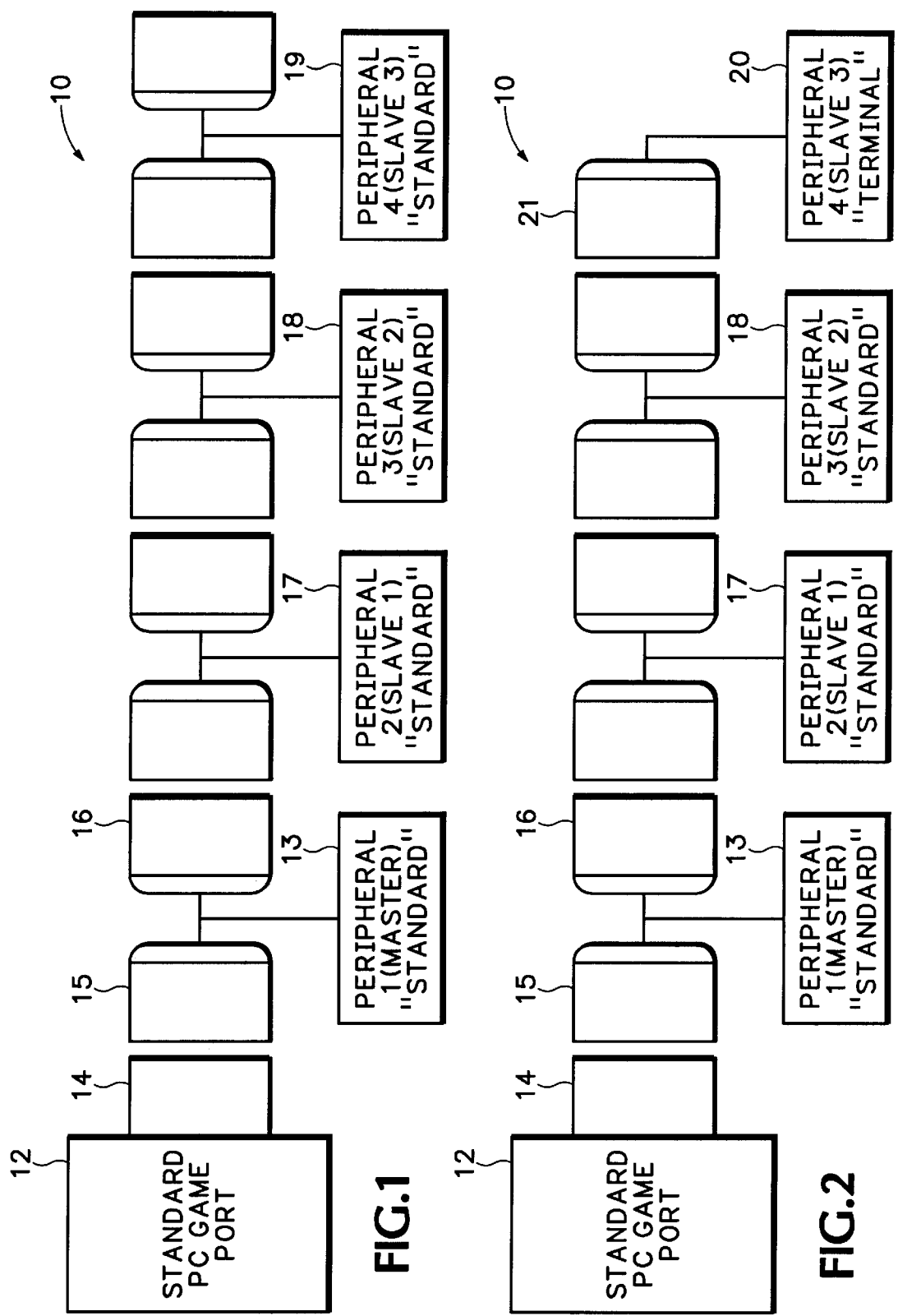

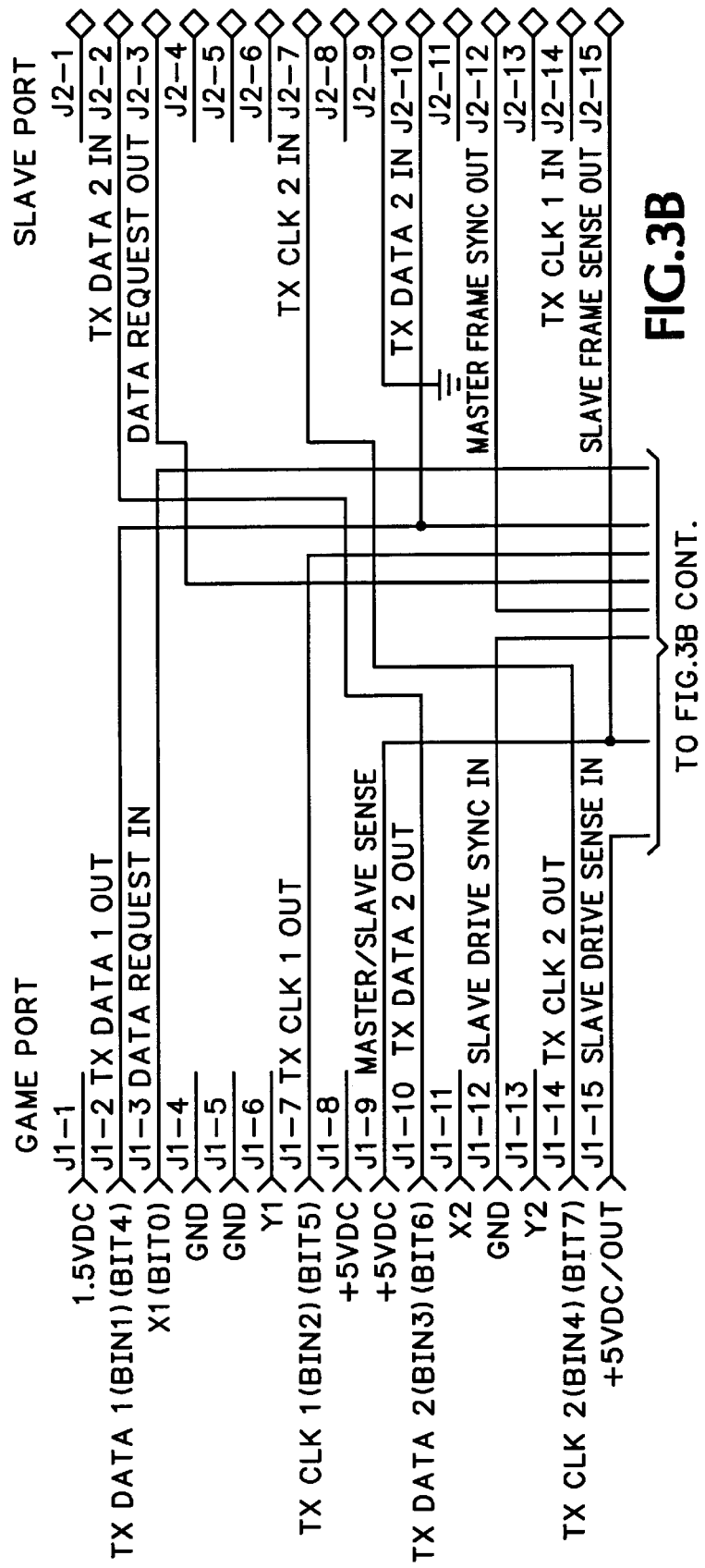

METHOD FOR BI-DIRECTIONAL DATA COMMUNICATION IN A DIGITAL GAME PORT

RELATED APPLICATION DATA

This application is a continuation-in-part of commonly-assigned U.S. application, Ser. No. 08/912,248, filed Aug. 15, 1997.

This application contains Microfiche Appendices A, B1 and B2. Micro Fiche Appendix A includes 1 microfiche with 10 frames. Appendix B1 includes 1 microfiche with 15 frames. Appendix B2 includes 1 microfiche with 30 frames.

BACKGROUND OF THE INVENTION

1. Field of the Invention

This invention relates generally to controllers for games and simulator programs implemented on a personal computer ("PC") and, more particularly, to bi-directional controller drivers having the capability of receiving transmitted digital controller data to the PC game port responsive to a PC microprocessor instruction.

2. Description of the Related Art

The PC has been through a good deal of change and evolution since its initial introduction. However, in some areas, the PC has changed little. One such area is the way in which the PC interfaces to external devices. Countless add-in cards and interfaces have been developed but, with few exceptions, these new add-in cards and interfaces have not become standard to the basic PC. The standard peripheral interfaces typically found on all new PCs are the parallel interface (printer interface), serial interface(s), the game board interface, the keyboard port, and sound card interface. Bi-directional communication between the host PC and external devices has generally been restricted to the serial interface(s). The parallel interface is notably not truly a bi-directional interface. The keyboard port has also been adopted for bi-directional communications (See U.S. Pat. Nos. 5,396,267 and 5,610,631; see also U.S. Pat. No. 4,824,111 to Hoye, et al.) but does not provide a truly bi-directional interface.

One problem with the current system is that the primary bi-directional interface, the serial interface, has speed limitations and is typically dedicated to other external devices such as the printers. When not dedicated to the system printer, the serial interface is in constant use by modems, faxes, scanners, mouse, and the like. Therefore, the serial interface has not been readily available to support game controllers.

Conventionally, a PC is enabled to be controlled by external manual control devices by means of a game board or card, which provides an external game port into which control devices, such as joysticks, rudders, hand-held game controllers and the like, can be plugged. Widespread compatibility is essential to the ability to mass market a wide variety of games and simulation programs.

Industry standards have been developed for game cards for personal computers such as those commonly referred to as IBM-compatibles. The universal adoption of these standards means that any external manual input device designed to control such computers and software must be compatible with the industry-standard game port. Any input device lacking such compatibility will not be able to be used to interface with conventional personal computers through standard game boards and will not be widely accepted.

One problem is that the industry standard game port provides only a limited number of inputs: four discrete signal inputs for receiving discrete signals signifying "On" and "Off" and four analog signal inputs for receiving variable voltage signals, such as output by a potentiometer, which are continuously variable over a limited range. The number of game boards that could be plugged into a conventional PC was also limited. A multiport game card is disclosed in commonly assigned U.S. Pat. No. 5,245,320 to Bouton. Consequently, the number of controllers supported by a standard game port, and the number of allowable functions communicated thereby, is severely restricted.

Additionally, the game card or board has been typically thought of as an input only device, that is, not having the capability of communication to and from the external device.

The industry-standard game port is a very simple, somewhat primitive, interface, especially in how it handles the analog inputs. The game port appears to the host PC, more particularly to the PC microprocessor, as an Input/Output ("I/O") address. The microprocessor communicates with I/O interfaces, like the game port, by sending instructions to the address assigned to the particular I/O device. A single I/O interface may have two or more ports, each port will have an individual address assigned.

The first game port will usually be assigned an address 0201 hex (base 16) or 513 decimal. To access the game card to read a button, for instance, the microprocessor performs an I/O READ from address 201h. The result is an 8-bit value where each of the 4 buttons is assigned a single bit. When a button is pressed on the game controller, a contact closure to ground is applied on the game port at a pin on the connector that corresponds to the button input to the game port. A logic low voltage at the input pin and at the corresponding bit indicates that the button has been pressed.

The byte read from the game port is typically configured as follows:

| BIT | 7 | 6 | 5 | 4 | 3 | 2 | 1 | 0 |
|-----|---|---|---|---|---|---|---|---|
|  | But4 | But3 | But2 | But1 | Y2 | X2 | Y1 | X1 |

Where:
But4 indicates button 4;
But3 indicates button 3;
But2 indicates button 2;
But1 indicates button 1;
X1 indicates forst X analog position;
Y1 indicates first Y analog position;
X2 indicates seconds X analog position; and
Y2 indicates second Y analog position.

For example, if the 8 bit value read from the game port is 11100000, the button pressed was button 1. You may notice that the analog positional values X1, Y1, X2, and Y2 are also represented by a single bit in this example. This is not the value of the analog input but rather a flag.

Reading an analog positional value is not as simple as reading a button value. U.S. Pat. No. 5,245,320 to Bouton, incorporated herein by reference, describes and illustrates the conventional game controller coupled to the game port. The analog positional values must be read by first causing the microprocessor to write to the address 201h by issuing a WRITE, 201h instruction. This instruction causes a monostable multivibrator or one-shot to fire an output voltage pulse which charges up to power supply voltage VCC. The width of the resulting pulse will be proportional to the resistance of the external device connected to the game port. The resistance of the external device will, in turn, be proportional to the position of the controller in one axis, the X axis, for example. This is because the output of the one-shot is presented to a capacitive load located on the game port and a resistive load located on the controller. Game controllers, for instance a joystick, have a potentiometer in both the X and Y axis. The resistive value of both of these potentiometers reflects the position of the joystick in the respective axis. The one-shot drives the analog line high and the time that the line stays high is a function of the time it takes for the capacitive value of the game port to charge through the device resistance. The RC-time constant, comprising the capacitive load of the game port and the resistive load of the joystick or controller, defines the width of the pulse. The PC microprocessor must then turn this pulse width value into a value that reflects the device position capable of use in games and other programs. Typically, this conversion is accomplished by using a counter timer. When the microprocessor writes to address 201h, a timer coupled to the one-shot is started. The timer is stopped when the output voltage pulse from the one-shot finally goes low. The timer ending count is proportional to the RC-time constant, and therefore indicative of the value of resistance and controller position.

A drawback is that the characteristics of the analog inputs can vary significantly from machine to machine. Game developers have attempted to circumvent this problem by providing calibration functions that normalize the game port inputs. These calibration functions will read the analog inputs for the extremes of travel of the respective external controller and, interactively with the user, assign values to these points. These assigned values are then used by the driver running on the host PC to scale and offset the raw analog input values read from the external controller. Additionally, since there are four analog inputs to be read, the microprocessor must divide its time between the four inputs. During the polling of the four inputs, the microprocessor typically masks service interrupts from other systems within the PC in order to eliminate deviation in position accuracy.

Attempting to address these and other limitations of the conventional game board, game developers have used the four discrete signal inputs and the four analog inputs in a variety of creative ways. One such way is described in U.S. Pat. No. 5,389,950 to Bouton, one of the present inventors, incorporated herein by reference. This patent describes a video game controller for inputting command signals to a game port having a finite number of discrete and analog signal inputs and providing a plurality of additional discrete outputs multiplexed on one of the analog outputs. The controller has a plurality of switches each coupled to the one analog output via a different value resistance. Circuitry in the game board in combination with programming in the computer game or simulation software recognizes discrete voltage levels input from the controller via the one analog port as different discrete commands. This enables the range of commands that can be input from a video game controller to be substantially increased without making any change to the base computer software. A similar method is described in U.S. Pat. No. 5,459,487 to the aforementioned inventor, incorporated herein by reference.

U.S. Pat. No. 5,593,350 to Bouton, et al., incorporated herein by reference, describes a high precision game card that generates a digital signal corresponding to each analog input signal from a controller. Each digital signal has a digital value proportional to the number of "reads" (READ instructions) to the game card by the PC microprocessor. The digital signals can therefore be read by the computer without disabling the computer interrupts. The game card converts the analog input signals to a corresponding numeric value and this value is compared with an output of a counter which counts the number of "reads" by the computer. If the number of "reads" equals or exceeds the numeric representation, the corresponding digital signal is deasserted. The digital signals are initially asserted responsive to a "write" (WRITE instruction) to the game card by the computer microprocessor. Alternatively, the numeric representations can be provided directly to the computer over the computer data bus. This embodiment provides all of the numeric representations over a single address.

Yet another example of novel ways in which the conventional game board interface has been used is disclosed in U.S. Pat. No. 5,245,320 again to the aforementioned inventor, incorporated herein by reference. In this invention, the game port provides support for at least two multifunctional game controllers via a single PC I/O bus connector. An address decoder selectively enables one of the game controllers in order to access the control input received therefrom. A program operating in the personal computer polls separate addresses within the game controller address space to receive input information from the different controllers. Jumper blocks map each of the plurality of controllers to separate and distinct addresses, in order to avoid address conflicts and provide flexibility.

U.S. Pat. No. 5,551,701 to Bouton, et al., incorporate herein by reference, describes yet another example of a video game system. The computer game control system in a PC with a game port and keyboard port includes a joystick. The joystick is connectable to both the game port and the keyboard port of the PC. The throttle and joystick controller inputs are reconfigurable to work with different video game programs by downloading a new set of keycodes from the personal computer via the keyboard port to a microcontroller and non-volatile memory in the throttle controller. The throttle and joystick controller have variable inputs which can be input to the PC in either analog or digital form. The digital inputs can be calibrated by changing their corresponding keycodes.

These are and other developments have been implemented by the present inventors in several commercially available products, including the F-16 FLCS™ Flight Control System game controller ("FCS"). The FCS controller includes analog circuitry mounted on a printed circuit assembly that completes the charging circuit found on the game board. The timer and charging circuit found on the game port is activated by the PC microprocessor by a WRITE, 201h instruction, as explained above. Once a charging cycle has begun, other circuitry on the board detects a predetermined charge level on this analog circuitry. The FCS responds to the detection of a predetermined charge level by processing data and transmitting the processed data back to the PC microprocessor via the keyboard port.

Other examples of novel embodiments of the game port interface exist, including those disclosed in U.S. Pat. No. 5,396,267 to Bouton and U.S. Pat. No. 5,610,631 to Bouton, et al., both incorporated herein by reference. Unfortunately, the aforementioned attempts to expand game port functionality have failed to fully address the limitations inherent in the conventional game board.

As games and simulations become more complex and sophisticated, game operators not only desire more game controller functions but more flexibility to configure controller functions to fit their individual playing style.

Especially, there is a need for many more configurable discrete or binary control inputs. The existing discrete or binary input capabilities of a conventional game port, even augmented by a keyboard port input device, does not permit the implementation of such a wide range of control inputs.

Existing game controllers have not provided much improvement or simplification in the configuration of the game input devices or expansion of the number of external devices supported. Moreover, the primitive manner in which the analog inputs are handled by the game port leads to variations in controller characteristics from machine to machine, as mentioned above. A related drawback is that a significant amount of microprocessor or driver time is spent in determining the position of the controller.

The advent of the Universal Serial Bus ("USB") might one day bypass these problems by increasing the number of bi-directional serial I/O ports on a PC, but that capability is not readily available as yet. Moreover, USB cannot readily be implemented on tens of millions of PCs now in use which rely on a game port as the primary interface of joysticks and other game controllers to PCs.

Accordingly, a need remains for a bi-directional game/simulation system including a game controller that allows inputting a plurality of external user-actuable control signals to a driver and subsequently to a video game or simulation program running on a PC via a conventional PC game port responsive to PC microprocessor commands.

SUMMARY OF THE INVENTION

It is, therefore, an object of the invention to provide a bi-directional game/simulation system that overcomes the problems associated with prior art game/simulation systems.

Another object of the invention is to provide a game controller that communicates with a driver running on a PC using a standard PC game port.

Yet a further object of the invention is to provide a system including a driver that allows communication between a PC having a single game port and more than a single game controller.

Yet a further object of the invention is to provide a driver that automatically identifies the game controller.

The invention is a new method of using the existing game port interface, one that not only eliminates the inherent inconsistencies of the existing game port but also significantly expands the number of devices that can be connected to a single game port. There are several aspects of the invention and the manner in which it can be implemented that are both creative and unique. The invention uses the conventional PC game port in an entirely new way, as a port for a digital game port (DGP) input device or controller arranged and operating according to the invention, and in so doing uses the game port as a dual bit stream serial port.

As mentioned above, it is clear that the value of such analog inputs can change from machine to machine and from game card to game card depending upon speeds, components, etc. One way the invention eliminates this variation is to convert the analog position value of the device at the device and then to transmit the value in digital form to a receiving driver for further processing at the PC. This eliminates the dependence upon the variant elements of the PC and interface between the PC and the device. Commonly-assigned U.S. Pat. No. 5,593,350 to Bouton, discloses an analog-to-digital game card capable of converting analog inputs from a controller to digital representations and inputting them to the PC data bus responsive to a WRITE instruction from the PC microprocessor to the game card. The present invention enables digital input from the DGP controller through a conventional game card.

The controller employs a Digital Game Port protocol according to the invention, which uses the four button lines and a single analog line (one of four) on the convention game board to form a dual serial port. The data transmitted in this dual serial configuration is packetized with each packet consisting of 13 bytes of data. The packets or blocks are then grouped into frames. A frame consists of two blocks of data. A total of two frames are transmitted to the host for each host request.

The 13 byte data block is divided between six one byte analog values and four bytes of digital data. In addition each packet contains three bytes that identify and define the device. This device definition and identification is quite unique and one of the special features of the Digital Game Port protocol. Since the device identification and configuration can be sent to the driver, the driver can determine not only the presence of the device but also very specific aspects of the device when using the Digital Game Port protocol.

The hardware configuration of the Digital Game Port cable is such that the first unit connected to the host computer is uniquely identified as the master unit by the driver. Other units in the chain are identified as slave units. Up to 3 additional slave units may be chained from the master digital game port input device by way of a special digital game port input cables. Each digital game port device can support the same number of analog and digital inputs as the master unit and each is uniquely identified. In the full configuration the Digital Game Port protocol will support 6 analog and 4 digital (32 buttons) times 4 units, giving at total of 24 analog and 128 digital or button inputs. This is a significant expansion of the existing game port input capability.

The foregoing and other objects, features, and advantages of the invention will become more readily apparent from the following detailed description of a preferred embodiment of the invention which proceeds with reference to the accompanying drawings.

BRIEF DESCRIPTION OF THE DRAWINGS

FIG. 1 is a block diagram of the interconnection of four devices in a Digital Game Port system of the present invention;

FIG. 2 is a block diagram of an alternative interconnection of four devices in a Digital Game Port system of the present invention;

Figure 3A:
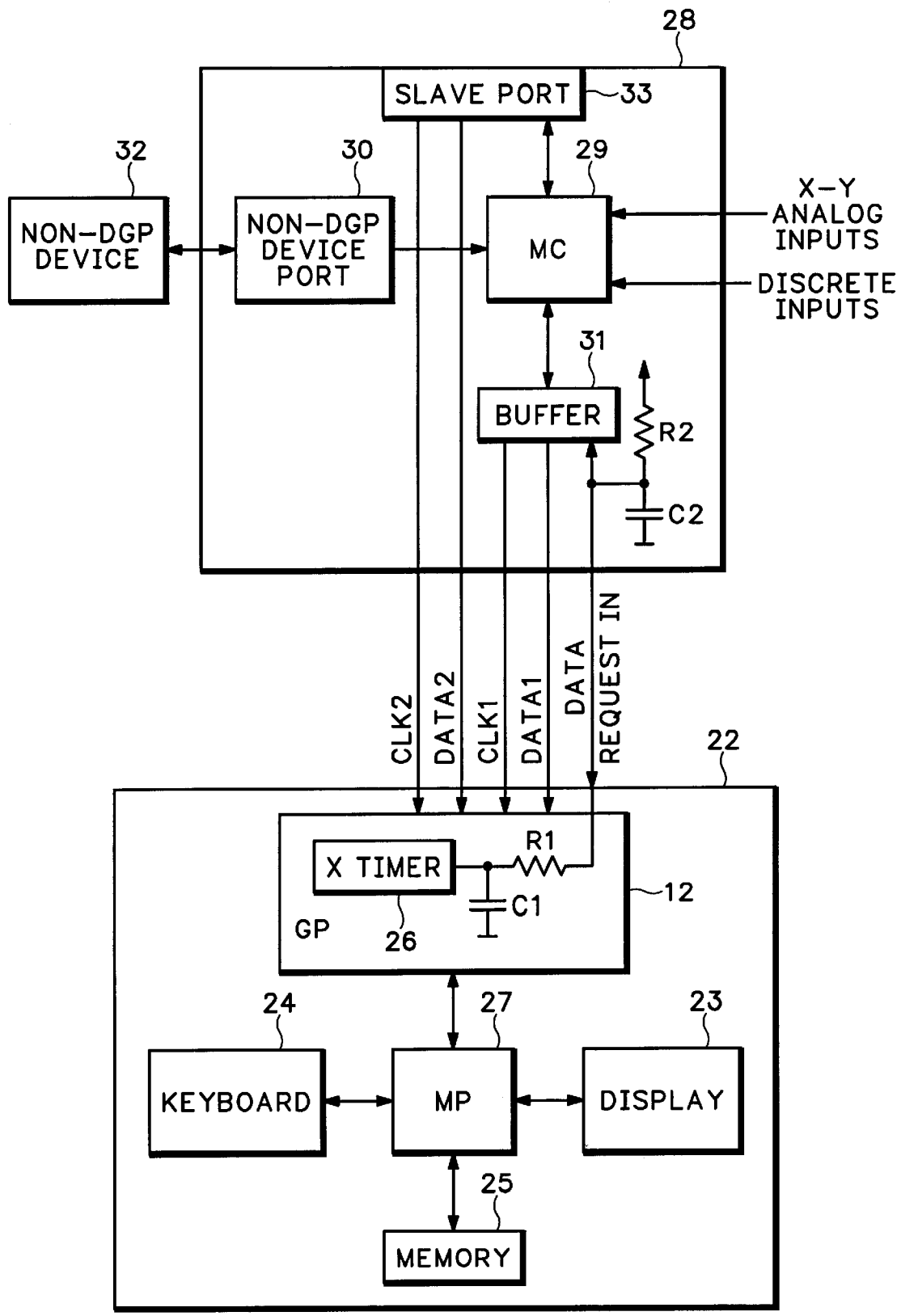
FIG. 3A is a functional block diagram of a Digital Game Port system of the present invention.
Figure 3B:
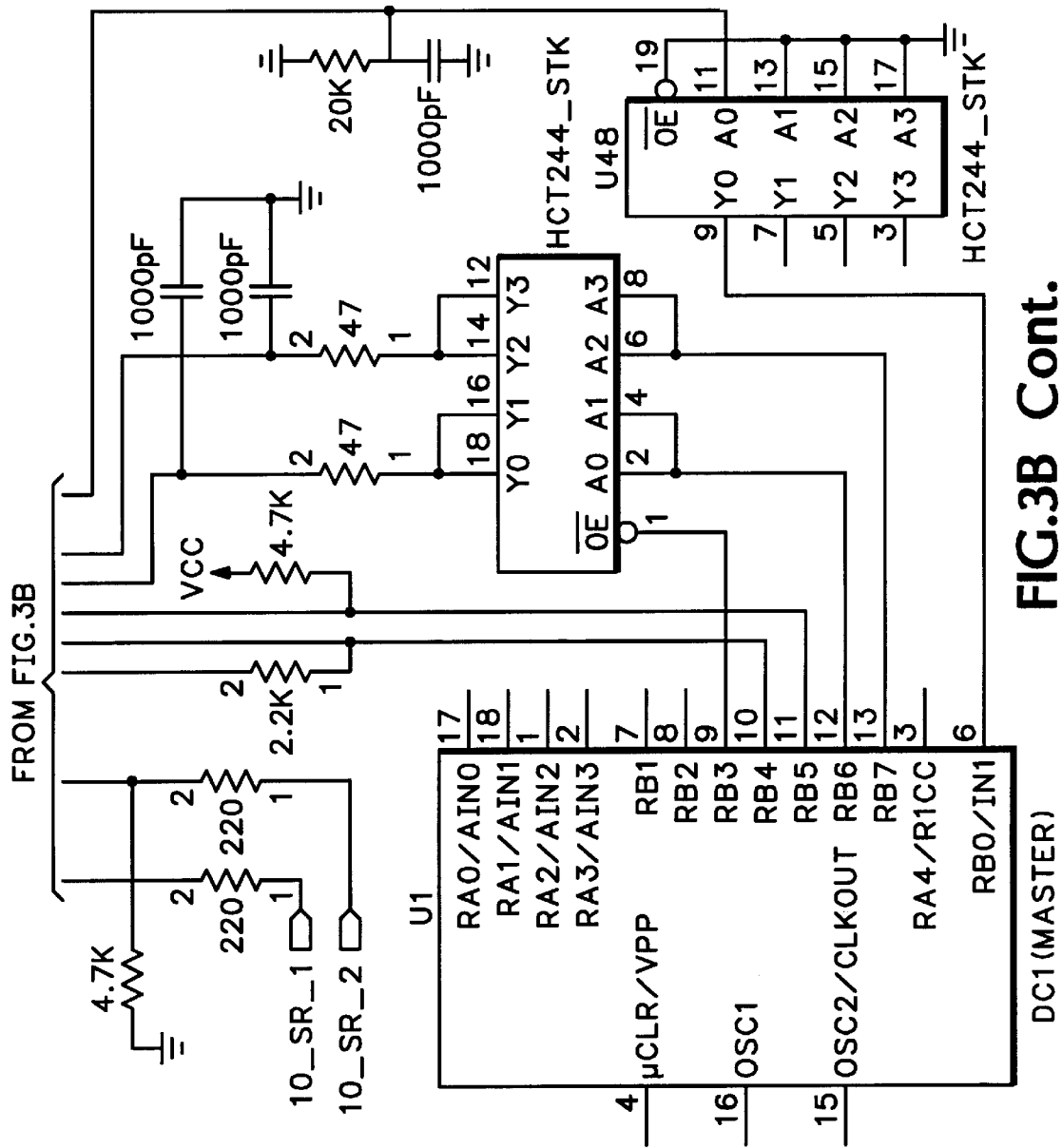
FIG. 3B is a schematic diagram of the Digital Game Port system of FIG. 3A.

TABLE 1 is an example of a 15-pin DSUB connector pin assignment for the Digital Game Port system shown in FIGS. 3A and 3B.

Appendix A is a printout of assembly language code for a preferred implementation of the controller firmware using the Microchip PIC 16C 711-04 microcontroller of FIG. 3B.

Appendix B is a printout of the code for a currently preferred implementation of the driver code.

DETAILED DESCRIPTION OF THE PREFERRED EMBODIMENT OF THE INVENTION

The Digital Game Port ("DGP") protocol uses the four button lines and a single analog line (one of four) on the conventional game board to form a dual serial port. The data transmitted in this dual serial configuration is packetized with each packet consisting of 13 bytes of data. The packets or blocks are then grouped into frames. A frame consists of two blocks of data. A total of two frames are transmitted to the host for each host request.

The 13 byte data block is divided between six one byte analog values and four bytes of digital data. In addition each packet contains three bytes that identify and define the device. This device definition and identification is quite unique and one of the special features of the DGP protocol. Since the device identification and configuration can be sent to the host, the host can determine not only the presence of the device but also very specific aspects of the device when using the DGP protocol. By doing so, the user is spared having to manually enter device specifications into the host PC through the computer keyboard, for example, for use by the host software.

FIG. 1 is a block diagram of the interconnection of four-DGP devices of the present invention. As shown in FIG. 1, the full configuration DGP system 10 includes four DGP devices coupled to a standard PC game port 12. DGP system 10 includes DGP devices 13, 17, 18, and 19 that are connected to each other by means of standard 15-pin DSUB connectors commonly used in game port interfaces. Typically, a DGP device has two external connectors 15 and 16. The hardware configuration of the DGP protocol cable is such that the first unit connected to the host computer is uniquely identified as master DGP device 13. Other units are identified as slave DGP units 17, 18, and 19. The second unit connected to the host computer is identified as first slave 17, the third unit connected to the host computer is second slave 18, and the fourth unit is third slave 19. As shown in FIG. 1, up to 3 additional slave devices 17, 18, and 19 may be chained from master device 13 by way of special game port input cables. Each DGP device can support the same number of analog and digital inputs as master device 13 and each is uniquely identified according to their position in the chain. In the full configuration, the DGP protocol will support 6 analog and 4 digital (32 buttons) times 4 units, resulting in a total of 24 analog and 128 digital or button inputs. This is a significant expansion of the existing game port input capability.

FIG. 2 is an alternate block diagram of the interconnection of four-DGP devices in DGP system 10 that shows a terminal DGP device 20. The difference between slave devices 17, 18, and 19 and terminal device 20 is that terminal device 20 has a single external connector 21 instead of two external connectors 15 and 16 present in slave devices 17, 18, and 19.

FIG. 3A is a functional block diagram illustrating selected elements of the system of the present invention. For the sake of brevity, not all the systems components are shown in FIG. 3A. However, the elements omitted are well known in the art and need not be described herein in further detail. Computer system 22 includes a microprocessor 27, memory 25 that may include read-only memory ("ROM"), as well as, random access memory ("RAM"). Computer system 22 also includes display 23 and its associated interfaces, keyboard 24, and game port 26. Game port 26 includes a charging circuit comprising timer 26, resistor R1, and capacitor C1 coupled to one of the analog terminals of game port 26. The various components of the computer are coupled together by a bus that includes both data lines, control lines, and the like. A power bus (not shown) distributes power to the various components.

DGP device 28 includes a buffer 31, a microcontroller 29, and a non-DGP device port 30. As is shown in FIGS. 1 and 2, four DGP devices like DGP device 28 can be chained together via slave port 33 and external connector 16 (shown in FIGS. 1 and 2). Microcontroller 29 is a conventional component utilizing memory, including ROM and RAM, as well as other conventional microprocessor elements such as I/O ports whose operation need not be described in detail herein. DGP device 28 also includes an analog circuit comprising R2 and C2 coupled to an analog terminal of the game port for completing the game board charging circuit. An example of an R2 value is 20KΩ and of C2 is about 1000 pF.

FIG. 3B is a schematic diagram of the present invention. In the presently preferred embodiment, microcontroller 29 is implemented by a Microchip PIC16C711 and buffer 31 in a Motorola hi-speed CMOS HCT244 Tri-state buffer with TTL compatible inputs. (The use of parts having TTL compatible is important to the design. Furthermore, the use of two driver gates for the clock and two for the data is also important. This provides enough drive current for the protocol to work with all known game cards. The interface circuitry is also intended to allow the DGP device to be "hot-pluggable." For traditional game port devices it is recommended to power off the computer before connection. DGP devices do not have this restriction.) The schematic shown in FIG. 3B includes a single DGP device but, as is mentioned above, three additional DGP slave devices can be chained together via the slave port. The DGP protocol is implemented in the DGP device by microcontroller 29 as shown in FIGS. 3A and 3B. Microcontroller 29 samples any digital (button, switch, etc.) inputs local to the DGP device and converts these inputs into the digital game port input stream. In addition, the DGP device can also include a port 30 for connection to a non-DGP device. Port 30 allows a non-DGP device 32 to be interfaced with a game board through the DGP device so as to convert non-DGP device data to the DGP data stream. By doing so, a non-DGP device can be used as if it were a DGP device.

Table 1, included with the attached drawings, is an example of a DGP protocol pin assignment for a 15-pin DSUB connector. DC1 refers to master device 13 that controls the timing synchronization of slave devices 17, 18, and 19. Any DGP peripheral is capable of being a master DGP device. The master or slave device determination is made based on the position the device has in the chain; the first device in the chain, connected directly to the PC, is always the master. A fully compliant game port having 4 discrete or button inputs and 4 analog axes inputs will support a maximum of four DGP devices (one master and three slave devices) connected in any one chain.

Figure 4:
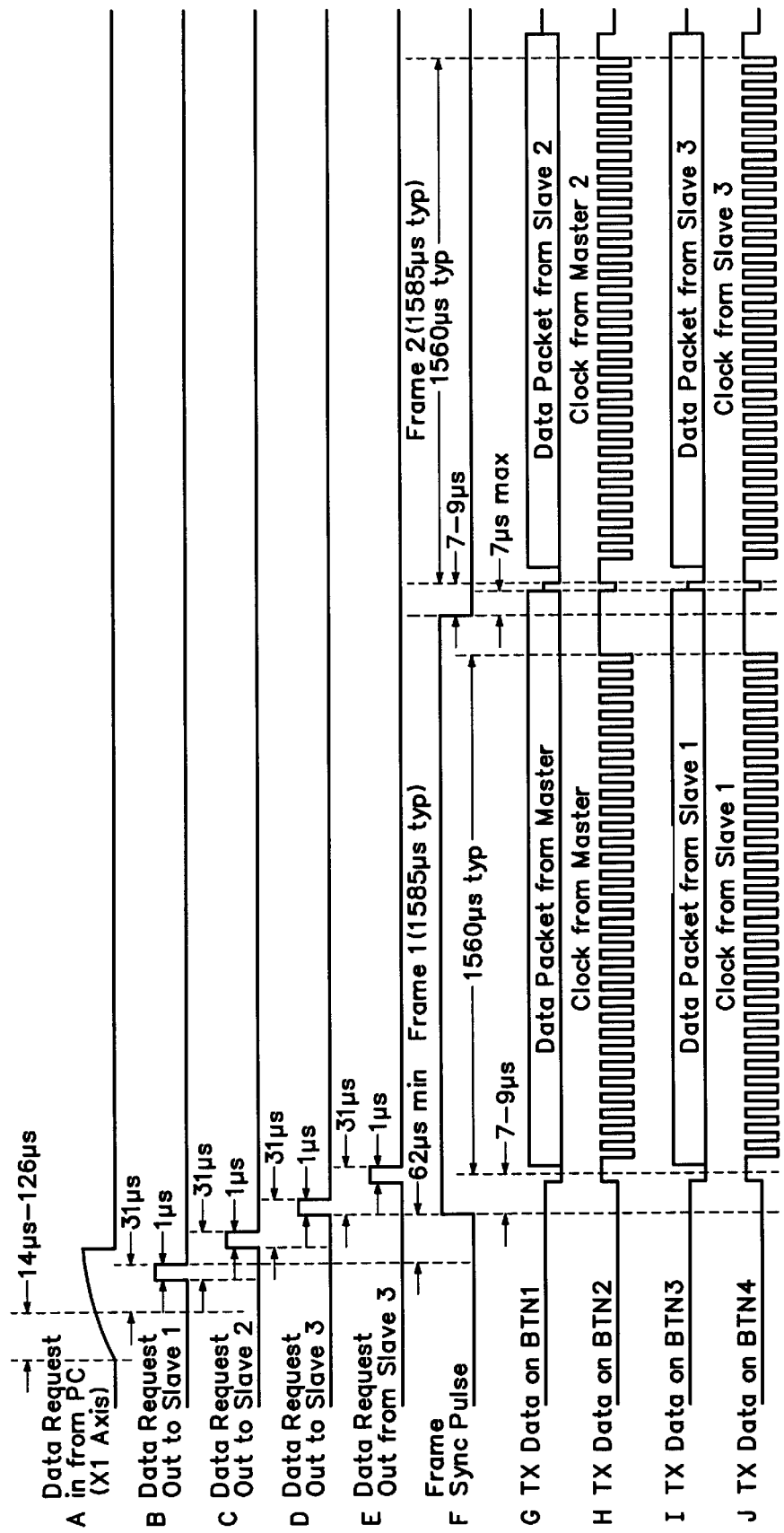
FIG. 4 are waveform timing diagrams of a four-Digital Game Port device system as shown in FIGS. 1 and 2.

The operation of DGP system 10 will be described with reference to FIG. 4 that illustrates waveform timing diagrams of a four DGP device system. Each DGP device will communicate to the host computer in the same manner. The master-slave relationship is simply one of timing. Master device 13 and first slave unit 17, if present, transmit data to the host during the first frame. Master device 13 transmits data using a pair of discrete or button input lines while slave device 17, if present, transmits data using another pair of discrete or button lines.

The sequence of events to acquire data from a DGP device is much different than reading either button or analog data in the conventional game port configuration.

The driver will initiate a write to I/O address 201 the same as with a normal game port read; however, from this point on, all similarity ends. The game port write causes the analog one shot to fire resulting in a low to high transition of the Data Request In line. Waveform A in FIG. 4 illustrates the Data Request In line. A typical low state of this line is a 2.2KΩ pull-down resistor to ground and a typical high state is a Hi-Z input of 2VDC minimum. In the presently preferred embodiment, the DGP device detects the Data Request In signal transition in less than 126µs assuming a worst case capacitor value on the PC game port of 10000 pF±20%.

Instead of using the Data Request In signal transition to time the charge of a capacitor, the rising edge is detected by the DGP device as an interrupt or data request. DGP master device 13 will respond to this data request by processing data and by echoing the request to any attached slave units 17, 18, or 19. (The reason that the Master echoes the "data request" to Slave1, and Slave1 echoes to Slave2, and Slave2 to Slave3, is so that interrupt response time is not affected by all 4 DGP loading the same data request line. In other words the response time remains the same regardless of how many units are connected.) At this point, master device 13 starts to transmit a data frame to the host.

The data requests generated from the Master to the Slave1, generated from Slave1 to Slave2, and generated from Slave2 to Slave3 are interrupts used as "early warning signals" to each of the slaves that the synchronization signal (Frame Sync) is about to occur. Each of the slaves in turn transmit their data packets in response to the appropriate edge of the synchronization signal. Slave1 transmits its data to the PC in response to the rising edge of a synchronization signal from the master. Slave2 (and Slave3) transmits its data to the PC in response to the falling edge of a synchronization signal from the master.

The software in APPENDIX A is the same for a DPG controller used as a slave as when it is used as the Master. A slave device is differentiated by detecting a slave frame sense signal (low) on pin J2-15 in FIG. 3B. Responsive to detecting the low signal, the slave accesses code in the APPENDIX A for the slave mode, which causes the slave, responsive to a data request signal, to look for the Frame Sync signal to be low. When that signal goes low, the slave begins transmitting its frame of data.

Waveforms B–E illustrate the echoing of Slave Data request signals from master device 13 to slave units 17, 18, and 19. A DGP device in slave mode responds to the Data Request In signal transition by pulsing its Data Request Out and subsequently being ready for an appropriate change in the Frame Sync signal. Master DGP device 13 changes the state of the Frame Sync signal from low to high beginning the transmission of Frame 1.

During Frame 1, master device 13 and first slave 17 first change the state of the Data line from a Hi-Z state to a logic low state and then transmit synchronized data using the two pairs of available button lines. After the Frame 1 data transfer is complete, the master device 13 changes the state of the Frame Sync signal from high to low beginning the transmission of Frame 2. Second slave 18 and third slave 19 respond to this high to low transition of the Frame Sync signal by first changing the state of the Data line from a Hi-Z to a logic low state and then transmit synchronized data to the host using the two pairs of available button lines as shown in Waveforms G–J of FIG. 4. After the transmission of a Frame of data both the Data and Clk lines return to a Hi-Z state.

In the presently preferred embodiment, the transmission time of a Frame of data takes no less than 1255 µs. The current implementation uses a 12 µs clock only +/-0.5%. The design allows for a maximum of 9 µs latency between the state change of Frame Sync and the actual transmission of data. The data itself takes 1560 µs typically after the latency. Furthermore, the Master unit waits an additional 16 µs typically before changing the state of Frame Sync again. This avoids a potential contention problem caused by variation in microcontroller crystal frequency from one DGP unit to another. It is important to note that 12 µs was selected because, even though interrupts are off in the PC, Direct Memory Access (DMA) is still occurring, particularly for sound effects. Since a relatively large amount of data is being transmitted, it is likely that DMA will "steal" some bus cycles and therefore create data errors by missing bits. By using 12 µs, the bit time is sufficiently long that data errors do not occur, because cycle stealing is not long enough to lose any bits.

A data packet from master device 13 is placed on one button line and a clock signal on another button line to synchronize the data as shown in Waveforms G–J. The data signal provides data start and stop pulses to assure proper data framing. The clock is used by the PC to determine when the data on button line paired with the clock line is valid. (It is somewhat of a misnomer to call the clock signal a clock; it is more correctly a bit-wise data valid pulse. Any time the clock is low, the data is guaranteed to be valid, even on the transition edges of the clock. This is significant in that it eliminates the need for over-sampling like a UART does. We can sample at exactly 12 µs without the loss of information. It helps defeat the Nyquist criteria.) Thus, simultaneously with the transmission of clock and master device data on one button pair, slave device data, if a slave device is present in the chain, can be transmitted on another button pair.

After the driver software initiates the write to input/output address 201, it continuously reads 201 for a fixed time and loads a memory buffer block with the data for post-processing. The host software detects the initial start pulse to assure synchronization and then determines when data is valid by detecting a high to low transition of the button line. When valid, the host software samples and saves the data. After reading both frames, the host has all the necessary data for up to 4 chained DGP devices. This data is then passed to the host software program/ game for use as needed.

Figure 5:
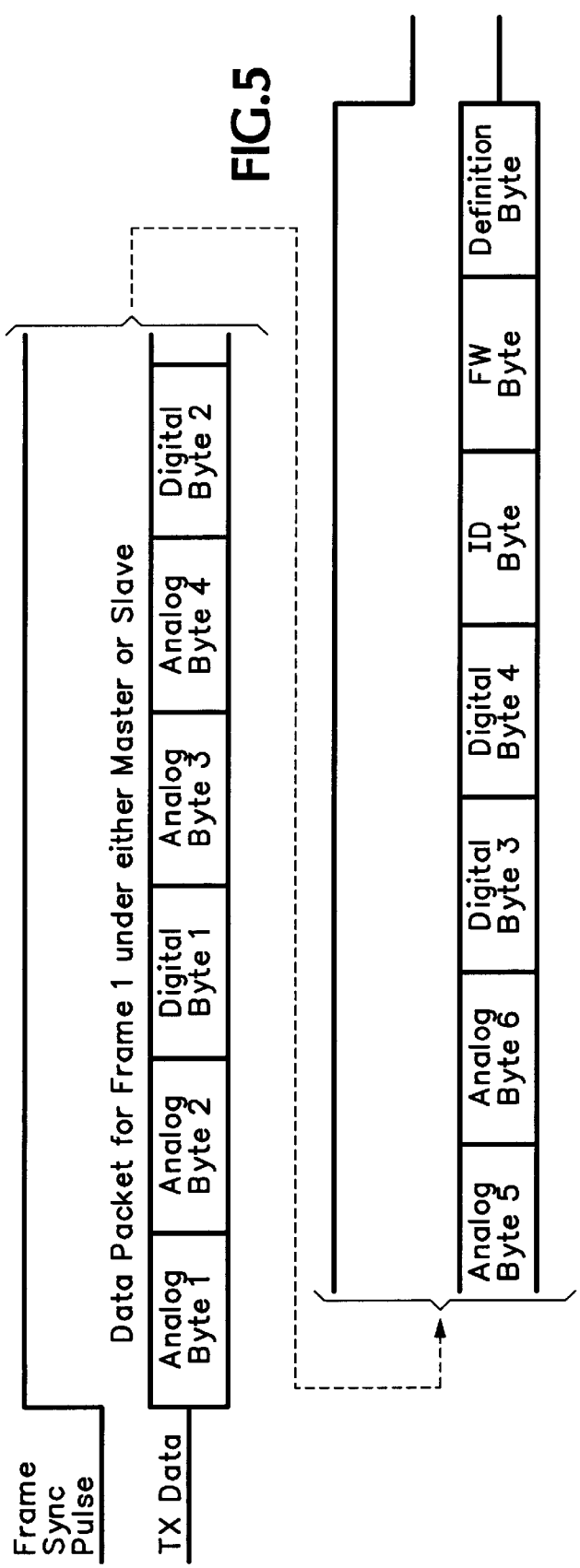
FIG. 5 is a timing diagram of the contents of a Digital Game Port data packet in the diagram of FIG. 4.

FIG. 5 is a timing diagram showing an example of the content of the data packet transmitted during a single frame. A frame consists of 13 bytes of data. In this example, data is transmitted in the following order: analog byte 1, analog byte 2, digital byte 1, analog byte 3, analog byte 4, digital byte 2, analog byte 5, analog byte 6, digital byte 3, digital byte 4, ID byte, FW byte, and Definition byte. The ID byte is an identifier string that uniquely identifies the DGP device to the host and, more particularly, the host software. The FW byte identifies the firmware revision of DGP internal microcontroller 29. The most significant nibble of the definition byte is a binary representation of the number of analog bytes with real data provided by the DGP device. The least significant nibble is the number of real digital bytes provided by the DGP device. The reason for the ordering of the data bytes, and the existence of the definition byte, is so the PC software only has to hang around long enough to get the data it needs. For instance, if a DGP device only has two axes and 8 switches, the PC resident software can return data to the game sooner.

Figure 6:
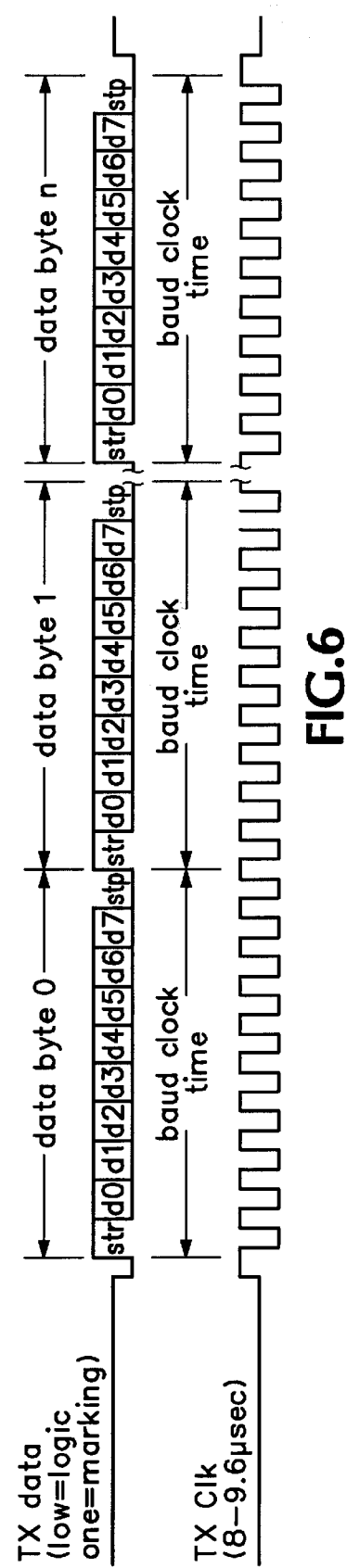
FIG. 6 is a timing diagram of the contents of a Digital Game Port data byte in the diagram of FIG. 4.

FIG. 6 is a timing diagram showing an example of the contents of a data byte. Each data byte has 10 bits consisting of a start bit, a stop bit, and 8 data bits arranged from least significant ("LSB") to most significant bit ("MSB") as shown. A DGP device first transmits a start bit in a logic low, spacing, or high voltage state. Next, 8 data bits are sent LSB to MSB. Finally, a stop bit is transmitted in a logic high, marking, or low voltage state. The DGP protocol supports 6 analog and 4 digital (32 buttons) times 4 units, giving at total of 24 analog and 128 digital or button inputs. This is a significant expansion of the existing game port input capability.

Figure 7:
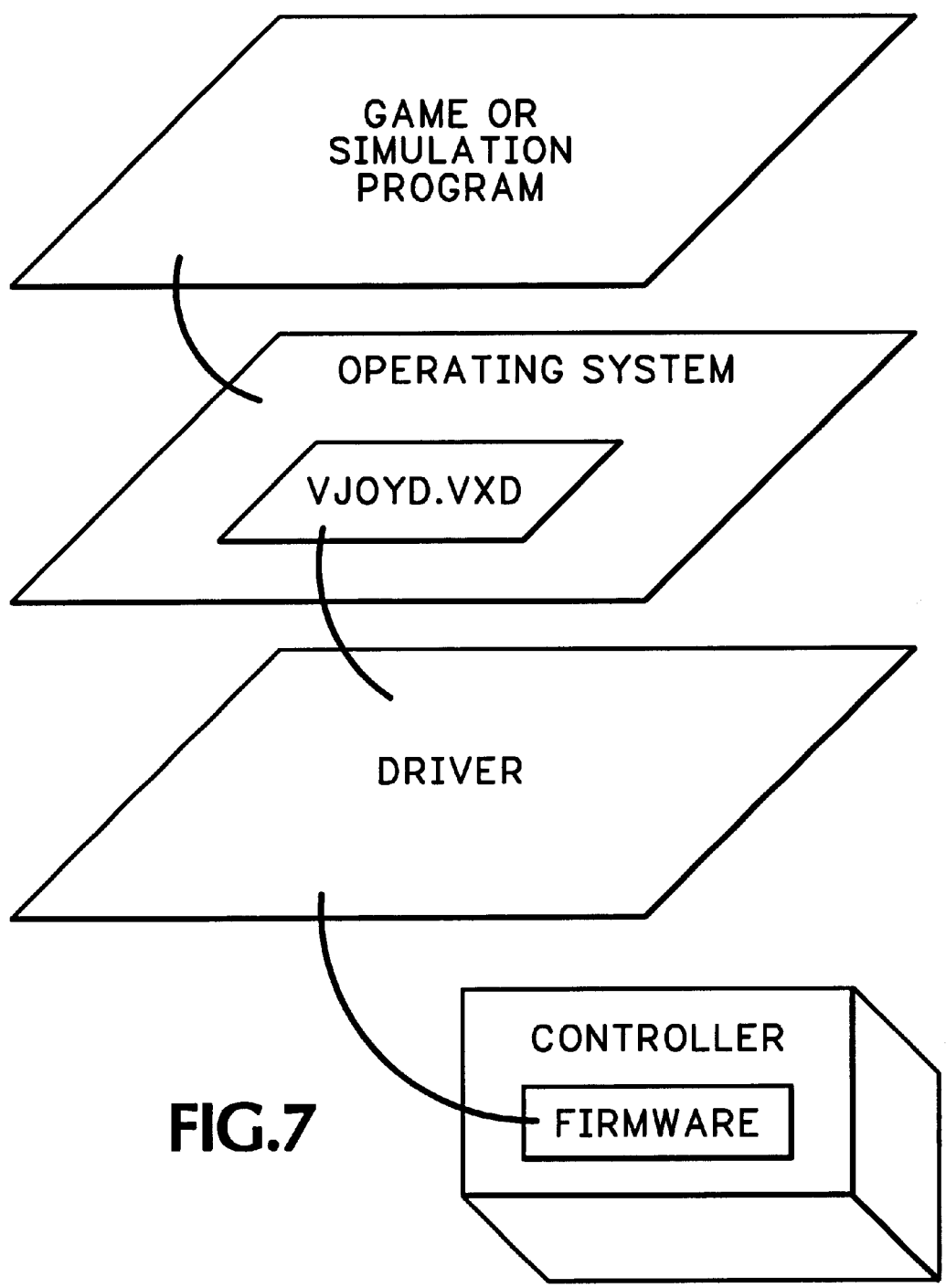
FIG. 7 is a block diagram of the software architecture of the Digital Game Port system of the present invention.

FIG. 7 is a block diagram of the software architecture of the DGP system shown in FIGS. 1–2. The software architecture includes a game or simulation program 70, the operating system 72, the driver 76, and the controller firmware 78 running on the DGP device 13. The game or simulation program 70 runs on the PC. When the game or simulation program 70 needs positional or other information from the DGP device 13, the game or simulation program 70 makes a standard call to the operating system 72. The operating system 72 is preferably Windows 95® manufactured by Microsoft® Corporation or a Windows 95® compatible operating system. The operating system 72 includes a conventional routine 74 that handles the collection of controller data like the VJOYD.VXD routine in Windows 95®. For devices that are not directly supported by Windows 95® such as DGP device 13, the VJOYD.VXD routine 74 calls the DGP-specific driver 76 to collect the data. The interface between the VJOYD.VXD routine 74 and the driver 76 is defined by the Windows 95® operating system and is outside the scope of the present invention. The driver 76 handles all communication between the DGP device 13, the operating system 72, and the game or simulation program 70. Although a single DGP device 13 is shown in FIGS. 7 and 8, a person skilled in the art should understand that driver 76 can support communication between a chain of up to four DGP devices, the operating system 72, and the game or simulation program 70.

Figure 8A:
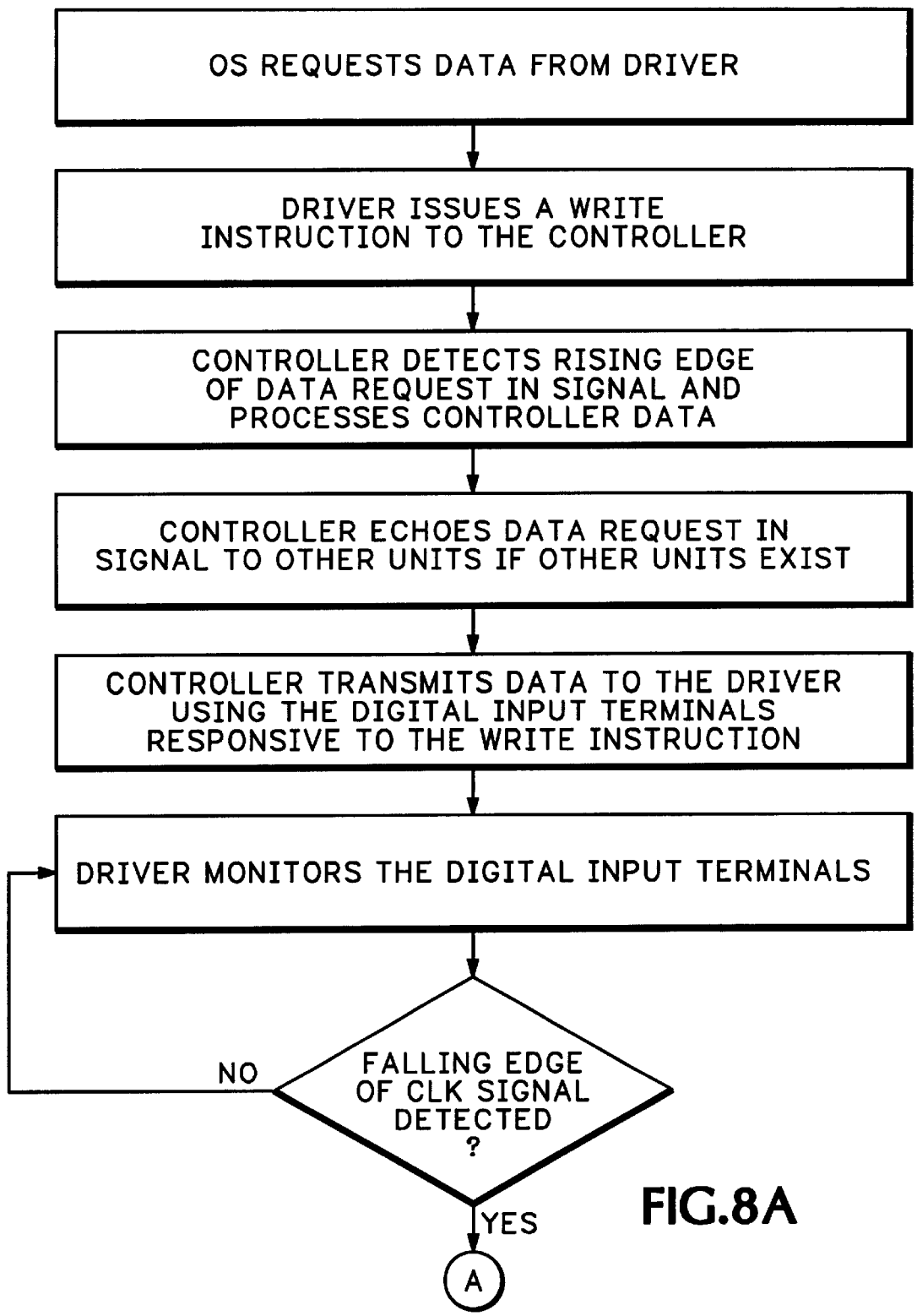
FIGS. 8A–8B are flowcharts of the driver software of the present invention.
Figure 8B:
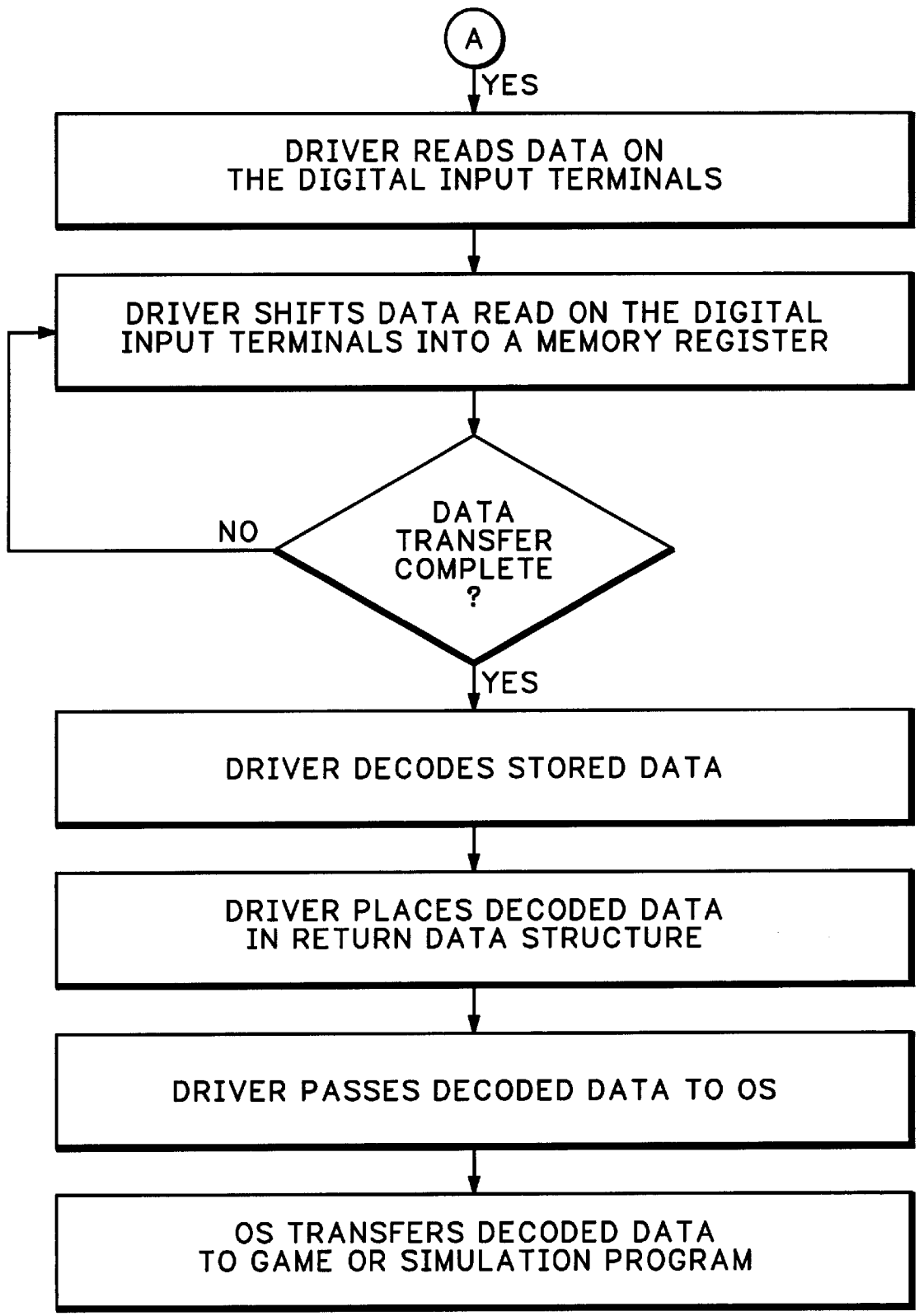

The operation of the driver 76 will be explained in more detail with reference to the flowchart shown in FIGS. 8A and 8B. At step 80, the operating system 70 initiates reading data from the DGP device 13 by requesting controller data from the driver 76. The driver 76 issues a write to I/O address 201 at step 82. The game port write causes the analog one shot to fire, resulting in a low to high transition of the Data Request In line, as explained above. The DGP master device 13 detects the rising edge of the Data Request In signal and interprets the detected edge as an interrupt or data request. The DGP device 13 responds to this data request by processing data (step 83) and by echoing the request to any attached slave units 17, 18, or 19 (step 84). At step 86, the DGP device 13 transmits controller data back to the driver using the digital input terminals of the game port responsive to the write instruction issued from the driver 76. The DGP device 13 transmits the controller data serially using a first digital input terminal to transmit the controller data signal and a second digital input terminal to transmit a first clock signal associated with the controller data signal.

If two or more DGP devices are chained together, the master device 13 will transmit its corresponding data and clock signals on the first and second digital input terminals followed by a data and clock signal associated with a second slave controller 18. The first slave device 17 transmits a first slave controller data signal using a third digital input terminal and a second clock signal using a fourth digital input terminal. If a third slave controller 19 exists in the chain, the third slave controller 19 transmits its corresponding data and clock signals after the first slave device 17 transmits its data and clock signals using the third and fourth digital input terminals.

After issuing the write instruction, the driver 76 monitors the game board's digital input terminals (step 88) until a logic high to low transition of the first clock signal is detected (step 90). At step 92, the driver 76 reads the controller data signal on the second digital input terminal. At step 94, the driver 76 transfers the controller data signal read at step 92 into a register the driver 76 maintains in memory. After the driver 76 completes transferring the controller data signal into memory (step 96), the driver 76 processes the contents of the memory register and extracts the actual digital and analog position values as well as the identification information included therein. At step 98, the driver 76 decodes the stored controller data signal by identifying and removing start and stop bits included in each data byte of information. The driver 76 the places the decoded values in a return data structure defined by Windows 95® (step 100) and passes control back to the VJOYD.VXD routine 74 (step 102). The VJOYD.VXD routine 74 scales the decoded values, if necessary, and passes the results back to the requesting application (step 104). Appendix B is a program listing of a currently preferred implementation of code for driver 76. The bspread.c and bspstate.c routines included in Appendix B together implement the above-described functions of the driver 76 including polling the I/O ports and reading and decoding data.

Having described and illustrated the principles of the invention in a preferred embodiment thereof, it should be apparent that the invention can be modified in arrangement and detail without departing from such principles. We claim all modifications and variations coming within the spirit and scope of the following claims.

TABLE 1

Connector Pin Assignments

| From | | | | To | | | |
|---|---|---|---|---|---|---|---|
| Unit | Conn | Pin | Description | Unit | Conn | Pin | Description |
| DC1 | J1 | 1 | +5 VDC Input. Internally wired to J2-1 in order to provide power out for next DC unit in the chain. | PC | GP | 1 | +5VDC Output (regulated) |
| | | | | DC1 | J2 | 1 | +5 VDC Output. |
| | | | | DC2 | J1 | 1 | +5 VDC Input. |

TABLE 1-continued

Connector Pin Assignments

| From | | | | To | | | |
|---|---|---|---|---|---|---|---|
| Unit | Conn | Pin | Description | Unit | Conn | Pin | Description |
| DC1 | J1 | 2 | TX DATA 1 Output. Internally connects to a high current drive (>40 mA) CMOS output through an RC filter. The RC filter is a 47 Ω/1000 pF low pass. Data is sent during frame 1. Also internally wired to J2–10 in order to connect to TX DATA 2 from next DC unit in the chain. This second set of data is sent during frame 2. Outputs are Hi-Z when not transmitting. See Section 4.1 Game Port Button Line Capacitive Loading Analysis for a more detailed discussion. | PC<br>DC1<br>DC2 | GP<br>J2<br>J1 | 2<br>I0<br>I0 | Button 1 Input.<br>TX DATA 1 Input.<br>TX DATA 2 Output. |
| DC1 | J1 | 3 | DATA REQUEST IN. Hi-Z TTL Input. Pullup = 20 kΩ with 1000 pF cap to ground. Connects to an HCT244 input. $V_{INHIGH}$ (min) = 2.0 VDC. Output used as a rising edge interrupt to indicates the PC has sent a data request. 20 kΩ pullup guarantees Vin low max of 0.542 V. Using worst case game card values yields a rise time variance of 14 to 126 μs. See Section 4.2 Data Request Delay Analysis for a more detailed discussion. | PC | GP | 3 | X1 Analog Input. |
| DC1 | J1 | 4 | GND Input. Internally wired to J2–4 in order to provide ground reference for next DC unit in chain. Also used to set the Master/Slave Sense Output to the next DC unit in the chain. | PC<br>DC1<br>DC1<br>DC2<br>DC2 | GP<br>J2<br>J2<br>J1<br>J1 | 4<br>4<br>9<br>4<br>9 | GND Output.<br>GND Output.<br>Master/Slave Sense Output.<br>GND Input.<br>Master/Slave Sense Input. |
| DC1 | J1 | 5 | GND Input. Internally wired to J2–5 in order to provide ground reference for next DC unit in chain. | PC<br>DC1<br>DC2 | GP<br>J2<br>J1 | 5<br>5<br>5 | GND Output.<br>GND Output.<br>GND Input. |
| DC1 | J1 | 6 | No Connection. | PC | GP | 6 | Y1 Analog Input. |
| DC1 | J1 | 7 | TX CLK 1 Output, Identical circuit to TX DATA 1 Output. Also internally wired to J2–14 in order to connect to TX CLK 2 from next DC unit in the chain. This second set of data is sent during frame 2. Outputs are Hi-Z when not transmitting. | PC<br>DC1<br>DC2 | GP<br>J2<br>J1 | 7<br>14<br>14 | Button 2 Input.<br>TX CLK 1 Input.<br>TX CLK 2 Output. |
| DC1 | J1 | 8 | +5 VDC Input. Internally wired to J2–8 in order to provide power out for next DC unit in the chain. | PC<br>DC1<br>DC2 | GP<br>J2<br>J1 | 8<br>8<br>8 | +5 VDC Output (regulated).<br>+5 VDC Output.<br>+5 VDC Input. |
| DC1 | J1 | 9 | MASTER/SLAVE SENSE Input. Internally connected to Hi-Z TTl inpuht through 220 Ω isolation resistor with a 4.7 kΩ pullup. If logic 1 (Vin = +5 V) unit is a master unit. Internally wired to J2–15 to provide SLAVE FRAME SENSE OUT to next DC unit in the chain. Only a unit directly connected to the master will receive a SLAVE FRAME SENSE IN of +5 V. 220 Ω provides impedance match. | PC<br>DC1<br>DC2 | GP<br>J2<br>J1 | 9<br>15<br>15 | +5 VDC Output (regulated)<br>SLAVE FRAME SENSE OUT.<br>SLAVE FRAME SENSE IN. |
| DC1 | J1 | I0 | TX DATA 2 Output. Connected to no internal components. Internally wired to J2–2 TX DATA 2 Input. This wire reroutes TX DATA 1 Output from the next DC unit in the chain to TX DATA 2 Output of this unit. TX DATA is therefore alternated. DC1 and DC3 TX DATA ends up connected to Button 1 line of the PC. They send their data during alternating frames. DC2 and DC4 TX DATA connects to Button 3 line of the PC. They send their data during alternating frames. | PC<br>DC1<br>DC2 | GP<br>J2<br>J1 | 10<br>2<br>2 | Button 3 Input.<br>TX DATA 2 Input.<br>TX DATA 1 Output. |
| DC1 | J1 | I1 | No Connection. | PC | GP | 11 | X2 Analog Input. |
| DC1 | J1 | I2 | SLAVE FRAME SYNC IN. Internally connects to CMOS output through a 2.2 kΩ isolation resistor in master mode (Hi-Z input in slave mode). Logically | PC | GP | 12 | GND Output/MIDI Output. |

TABLE 1-continued

Connector Pin Assignments

| From | | | | To | | | |
|---|---|---|---|---|---|---|---|
| Unit | Conn | Pin | Description | Unit | Conn | Pin | Description |
| | | | this input is a "don't care" to the master unit. Master unit must drive against this effective pull-down as the other side of the resistor is connected to MASTER FRAME SYNC OUT. μC is capable of providing the required 2.4 mA of drive current. Impedance matched to input of other DC units. Output idles at low for low current. Drive hi into 2.2 kΩ load only during frame 1 transmission. See Section 4.3 MIDI Compatibility. | | | | |
| DC1 | J1 | 13 | No Connection. | PC | GP | 13 | Y2 Analog Input. |
| DC1 | J1 | 14 | TX CLK 2 Output. Connected to no internal components. Internally wired to J2–7 TX CLK 2 Input. This wire reroutes TX CLK 1 Output from the next DC unit in the chain to TX CLK 2 Output of this unit. TX CLK is therefore alternated. DC1 and DC3 TX CLK ends up connected to Button 2 line of the PC. They send their clocks during alternating frames. DC2 and DC4 TX CLK connects to Button 4 line of the PC. They send their clocks during alternating frames. | PC | GP | 14 | Button 4 Input. |
| | | | | DC1 | J2 | 7 | TX CLK 2 Input. |
| | | | | DC2 | J1 | 7 | TX CLK 1 Output. |
| DC1 | J1 | 15 | SLAVE FRAME SENSE IN. Internally connected to Hi-Z TTL input through 220 Ω isolation resistor. If logic 1 (Vin= +5 V) DC slave unit transmits data and clock during frame 1. This signal input is a logical "don't care" to a master unit. See Section 4.3 MIDI Compatability. | PC | GP | 15 | +5 VDC Output or MIDI Input. |
| DC1 | J2 | 1 | +5 VDC Output. See J1–1 description. | PC | GP | 1 | +5 VDC Output (regulated). |
| | | | | DC1 | J1 | 1 | +5 VDC Input. |
| | | | | DC2 | J1 | 1 | +5 VDC Input. |
| DC1 | J2 | 2 | TX DATA 2 Input. Reroutes TX DATA 1 Output from next DC unit in the chain to J1–10 TX DATA 2 Output. Connected to no internal components. | PC | GP | 10 | Button 3 Input. |
| | | | | DC1 | J1 | 10 | TX DATA 2 Output. |
| | | | | DC2 | J1 | 2 | TX DATA 1 Output. |
| DC1 | J2 | 3 | DATA REQUEST OUT Output. CMOS output with 4.7 kΩ pull-up. Any unit either master or slave responds to a DATA REQUEST IN by providing a logic 1 (+5 V) pulse on DATA REQUEST OUT. Each successive DC unit receives it's interrupt from the previous unit and provides an interrupt to the next unit. This insures a worst case delay of 3 latency periods betweem the first interrupt edge on DATA REQUEST IN to all DC units ready to transmit. Loading effects on the X1 Analog Input of the PC by multiple DC units is eliminated. Only the "rise time" of DATA REQUEST IN of the Master (based upon the PC's variable capacitance) is an uncertainty. This signal idles low. | DC2 | J1 | 3 | DATA REQUEST IN Input. |
| DC1 | J2 | 4 | GND Output. See J1–4 description. | PC | GP | 4 | GND Output. |
| | | | | DC1 | J1 | 4 | GND Input. |
| | | | | DC2 | J1 | 4 | GND Input. |
| DC1 | J2 | 5 | GND Output. See J1–5 description. | PC | GP | 5 | GND Output. |
| | | | | DC1 | J1 | 5 | GND Input. |
| | | | | DC2 | J1 | 5 | GND Input. |
| DC1 | J2 | 6 | No Connection. | DC2 | J1 | 6 | No Connection. |
| DC1 | J2 | 7 | TX CLK 2 Input. Reroutes TX CLK 1 Output from next DC unit in the chain to J1–14 CLK 2 Output. Connected to no internal components. | PC | GP | 14 | Button 4 Input. |
| | | | | DC1 | J1 | 14 | TX CLK 2 Output. |
| | | | | DC2 | J1 | 7 | TX CLK 1 Output. |
| DC1 | J2 | 8 | +5 VDC Output. See J1–8 description. | PC | GP | 8 | +5 VDC Output (regulated). |

TABLE 1-continued

Connector Pin Assignments

| From | | | | To | | | |
|---|---|---|---|---|---|---|---|
| Unit | Conn | Pin | Description | Unit | Conn | Pin | Description |
| | | | | DC1 | J1 | 8 | +5 VDC Input. |
| | | | | DC2 | J1 | 8 | +5 VDC Input. |
| DC1 | J2 | 9 | Master/Slave Sense Output. Providing a logic 0 on this line indicates to the next DC unit it the chain that it i a slave unit. See J1–4 description. | PC | GP | 4 | GND Output. |
| | | | | DC1 | J1 | 4 | GND Input. |
| | | | | DC1 | J2 | 4 | GND Output. |
| | | | | DC2 | J1 | 4 | GND Input. |
| | | | | DC2 | J1 | 9 | Master/Slave Sense Input |
| DC1 | J2 | 10 | TX DATA 1 Input. See J1–2 Description. | PC | GP | 2 | Button 1 Input. |
| | | | | DC1 | J1 | 2 | TX DATA 1 Output. |
| | | | | DC2 | J1 | 10 | TX DATA 2 Output. |
| DC1 | J2 | 11 | No Connection. | DC2 | J1 | 11 | No Connection. |
| DC1 | J2 | 12 | MASTER FRAME SYNC Output. CMOS output. Master unit drives against 2.2 kΩ pulldown. Also drives into 2.2 kΩ series resistor into 50 pF of gate capacitance. This yields <1 μs rise time delay between units in addition to cable delay. | DC2 | J1 | 12 | SLAVE FRAME SYNC Input. |
| DC1 | J2 | 13 | No Connection. | DC2 | J1 | 13 | No Connection. |
| DC1 | J2 | 14 | TX CLK 1 Input. See J1–7 Description. | PC | GP | 7 | Button 1 Input. |
| | | | | DC1 | J1 | 7 | TX CLK 1 Output. |
| | | | | DC2 | J1 | 14 | TX CLK 2 Output. |
| DC1 | J2 | 15 | SLAVE FRAME SENSE Output. Rerouted MASTER/SLAVE SENSE Input. Only the first two DC units in the chain will detect a logic high (+5 V) here. | PC | GP | 9 | +5 VDC Output (regulated). |
| | | | | DC1 | J1 | 9 | +5 VDC Input. |
| | | | | DC2 | J1 | 15 | SLAVE FRAME SENSE Inpt. |

What is claimed is:

1. A method for bi-directional communication between at least one game controller, a game port mounted on a personal computer, and a driver running on the personal computer, the game port having a charging circuit responsive to a personal computer instruction, analog input terminals, and digital input terminals, the at least one game controller having an analog circuit coupled to the game port for completing the charging circuit, wherein the at least one game controller includes a master game controller and a first slave game controller, the method comprising:
   sending the personal computer instruction from the driver to the game port;
   charging the charging circuit from a first voltage level to a second voltage level responsive to the personal computer instruction;
   detecting a predetermined voltage level on the charging circuit;
   generating a frame synchronization signal responsive to the detecting the predetermined voltage level;
   serially transmitting controller data on a first digital input terminal and a controller clock on a second digital input terminal to the driver responsive to the frame synchronization signal; and
   processing the serially transmitted controller data responsive to the controller clock;
   wherein serially transmitting controller data to the driver includes:
      serially transmitting master controller data on the first digital input terminal to the driver responsive to a first edge of the frame synchronization signal;
      serially transmitting a first clock signal on the second digital input terminal to the driver responsive to the first edge of the frame synchronization signal, the first clock signal corresponding to the master controller data signal;
      serially transmitting a first slave controller data on a third digital input terminal responsive to the first edge of the frame synchronization signal; and
      serially transmitting a second clock signal on a fourth digital input terminal responsive to the first edge of the frame synchronization signal, the second clock signal corresponding to the first slave controller data signal.

2. The method for bi-directional communication of claim 1 wherein processing the transmitted controller data includes:
   continuously monitoring the second digital input terminal for a transition of the first clock signal;
   continuously monitoring the fourth digital input terminal for a transition of the second clock signal;
   detecting a transition of the first clock signal;
   detecting a transition of the second clock signal;
   reading the master controller data signal responsive to detecting the transition of the first clock signal; and
   reading the slave controller data signal responsive to detecting the transition of the second clock signal.

3. The method for bi-directional communication of claim 2 including shifting the master and slave controller data signal into a memory block after reading the master and slave controller data signal.

4. The method for bi-directional communication of claim 1 wherein the master and slave controller data signal includes a corresponding plurality of data bytes, each data byte having a corresponding start and stop bit and wherein processing the transmitted controller data includes:
   identifying a start and a stop bit for each of the plurality of master and slave data bytes; and
   decoding each of the plurality of master and slave data bytes after identifying the corresponding start and stop bits.

5. The method for bi-directional communication of claim 4 wherein decoding each of the plurality of master and slave data bytes includes identifying the master and slave controller.

6. The method for bi-directional communication of claim 1 including a second slave controller and wherein serially transmitting controller data to the driver includes:

serially transmitting a second slave controller data on the first digital input terminal to the driver responsive to a second edge of the frame synchronization signal; and serially transmitting a third clock signal on the second digital input terminal to the driver responsive to the second edge of the frame synchronization signal, the third clock signal corresponding to the second slave controller data signal.

7. The method for bi-directional communication of claim 1 comprising echoing the frame synchronization signal to the first and second slave controllers.

* * * * *